(12) United States Patent
Sato (10) Patent No.: US 11,235,470 B2
(45) Date of Patent: Feb. 1, 2022

(54) CONTROL APPARATUS, AND PROCESSING METHOD AND PROGRAM THEREFOR

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 16/555,068

(22) Filed: Aug. 29, 2019

(65) Prior Publication Data

US 2020/0094410 A1 Mar. 26, 2020

(30) Foreign Application Priority Data

Sep. 21, 2018 (JP) .............................. JP2018-177483

(51) Int. Cl.
*B25J 9/16* (2006.01)
*B25J 19/00* (2006.01)

(52) U.S. Cl.
CPC ......... *B25J 9/1674* (2013.01); *B25J 19/0004* (2013.01); *G05B 2219/34163* (2013.01); *G05B 2219/34174* (2013.01); *G05B 2219/34454* (2013.01); *G05B 2219/34455* (2013.01); *G05B 2219/41279* (2013.01)

(58) Field of Classification Search
CPC ................ B25J 9/1674; B25J 19/0004; G05B 2219/34163; G05B 2219/34174; G05B 2219/34454; G05B 2219/34455; G05B 2219/4127
USPC ....................................................... 318/565
See application file for complete search history.

(56) References Cited

U.S. PATENT DOCUMENTS

| 9,834,096 | B2 * | 12/2017 | Kim .......................... B60L 7/18 |
| 2016/0221561 | A1 * | 8/2016 | Leroy ..................... B60T 13/52 |
| 2019/0262987 | A1 | 8/2019 | Oyama |
| 2019/0383335 | A1 | 12/2019 | Tagashira |
| 2021/0237906 | A1 * | 8/2021 | Buenvenida ........... B64D 45/00 |

FOREIGN PATENT DOCUMENTS

| JP | 11-179691 A | 7/1999 |
| JP | 2017-064802 A | 4/2017 |
| JP | 2017-185595 A | 10/2017 |
| JP | 2018-083268 A | 5/2018 |

* cited by examiner

*Primary Examiner* — Kawing Chan
(74) *Attorney, Agent, or Firm* — Sughrue Mion, PLLC (57) ABSTRACT

A control apparatus includes driving means for rotationally driving a predetermined mechanism, braking means for braking the driving means by pressing a pressing unit against a rotation unit of the driving means, and control means for, in order to change rotation position of the predetermined mechanism, controlling the driving means in a braking release period in which the pressing unit is returned to a predetermined position to temporarily maintain the rotation position of the predetermined mechanism, and then driving the predetermined mechanism to thereby change the rotation position. The control apparatus performs at least one of notification to the user, braking of the predetermined mechanism, and stopping of the driving means when a command time for the driving means at the time of temporarily maintaining the rotation position of the predetermined mechanism is longer than or equal to a predetermined time.

5 Claims, 6 Drawing Sheets

CONTROL APPARATUS, AND PROCESSING METHOD AND PROGRAM THEREFOR

CROSS REFERENCE TO RELATED APPLICATIONS

This application is based upon and claims the benefit of priority from Japanese patent application No. 2018-177483, filed on Sep. 21, 2018, the disclosure of which is incorporated herein in its entirety by reference.

BACKGROUND

The present disclosure relates to a control apparatus that controls a predetermined mechanism, a processing method and a program therefor.

For example, there is a known control apparatus including an actuator that rotationally drives a joint of a robot and a braking unit that brakes the actuator and maintains a posture of the robot when the actuator does not operate (see Japanese Unexamined Patent Application Publication No. H11-179691).

SUMMARY

Incidentally, when the braking unit becomes worn down, torque for braking the actuator may become insufficient, and the posture of a predetermined mechanism such as a robot may be collapsed.

The present disclosure has been made to solve such a problem. A main object of the present disclosure is to provide a control apparatus capable of effectively preventing a posture of a predetermined mechanism from being collapsed by predicting insufficient braking torque, and a processing method and a program therefor.

An example aspect of the present disclosure to achieve the above object is a control apparatus including:

driving means for rotationally driving a predetermined mechanism;

braking means for braking the driving means by bringing a pressing unit into contact with a rotation unit of the driving means and pressing the pressing unit against the rotation unit of the driving means; and control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position.

The control apparatus performs at least one of notification to a user, the braking of the predetermined mechanism, and stopping of the driving means when a command time for the driving means at the time of temporarily maintaining the rotation position of the predetermined mechanism is longer than or equal to a predetermined time.

In this example aspect, the control apparatus may further include abnormality determination means for calculating the command time as an attraction time from a state in which the pressing unit is brought into contact with the rotation unit and is pressed against the rotation unit until the pressing unit is separated from the rotation unit and is returned to a predetermined position, calculating braking torque when the pressing unit is pressed against the rotation unit based on the calculated attraction time, and determining that the braking means is abnormal when the calculated braking torque becomes less than or equal to a threshold. The control means may perform at least one of the notification to the user, the braking of the predetermined mechanism, and the stopping of the driving means when the abnormality determination means determines that the braking means is abnormal.

In this example aspect, the control apparatus may further include learning means for inputting an attraction time, and outputting an abnormality determination of the braking means to machine-learn a relationship between the attraction time and the abnormality determination of the braking means, the attraction time being a time from a state in which the pressing unit is brought into contact with the rotation unit until the pressing unit is separated from the rotation unit and is returned to a predetermined position; and abnormality determination means for determining that the braking means is abnormal when the attraction time is input to the machine learning means, and the learning means outputs an abnormal determination of the braking means. When the abnormality determination means determines that the control means is abnormal, the control means may perform at least one of the notification to the user, the braking of the predetermined mechanism, and the stopping of the driving means.

Another example aspect of the present disclosure to achieve the above object is a processing method of a control apparatus including:

driving means for rotationally driving a predetermined mechanism;

braking means for braking the driving means by bringing a pressing unit into contact with a rotation unit of the driving means and pressing the pressing unit against the rotation unit of the driving means; and control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position. The processing method may include performing at least one of notification to a user, the braking of the predetermined mechanism, and stopping of the driving means when a command time for the driving means at the time of temporarily maintaining the rotation position of the predetermined mechanism is longer than or equal to a predetermined time.

Another example aspect of the present disclosure to achieve the above object is a program of a control apparatus including:

driving means for rotationally driving a predetermined mechanism;

braking means for braking the driving means by bringing a pressing unit into contact with a rotation unit of the driving means and pressing the pressing unit against the rotation unit of the driving means; and control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position.

The program may cause a computer to execute a process of performing at least one of notification to a user, the braking of the predetermined mechanism, and stopping of the driving means when a command time for the driving means at the time of temporarily maintaining the rotation position of the predetermined mechanism is longer than or equal to a predetermined time.

According to the present disclosure, it is possible to provide a control apparatus capable of effectively preventing a posture of a predetermined mechanism from being collapsed by predicting an insufficient braking torque, and a processing method and a program therefor.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, embodiments of the present disclosure will be described with reference to the drawings. A control apparatus according to a first embodiment of the present disclosure controls, for example, a predetermined mechanism such as a robot. Robots include robot arms, legged robots, humanoid robots, and the like.

Figure 1:
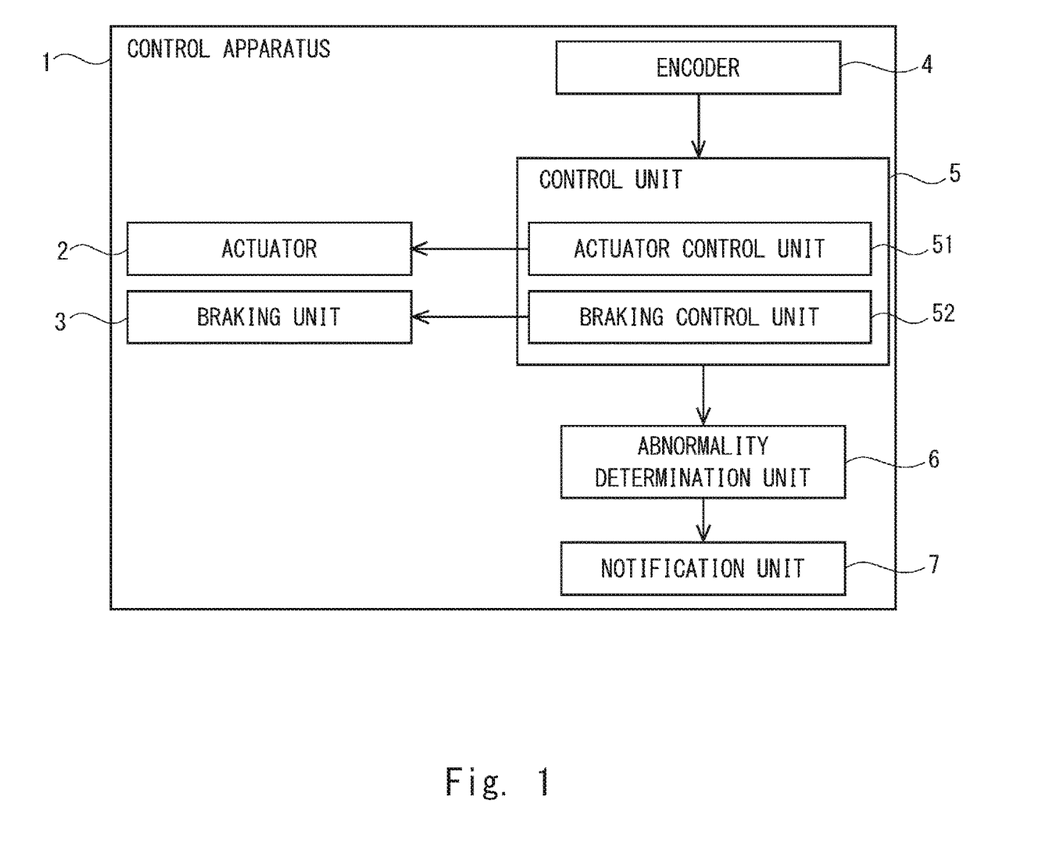
FIG. 1 is a block diagram showing a schematic system configuration of a control apparatus according to a first embodiment of the present disclosure.

FIG. 1 is a block diagram showing a schematic system configuration of the control apparatus according to the first embodiment. The control apparatus 1 according to the first embodiment includes an actuator 2 that rotates a joint of a robot, a braking unit 3 that brakes the actuator 2, an encoder 4 that detects a rotation of the actuator 2, a control unit 5 that controls the actuator 2 and the braking unit 3, an abnormality determination unit 6 that determines an abnormality of the braking unit 3, and a notification unit 7 that notifies a user of the abnormality of the braking unit 3.

A main hardware configuration of the control apparatus 1 includes a microcomputer composed of, for example, a CPU (Central Processing Unit) that performs control processing, calculation processing, etc., a memory composed of a ROM (Read Only Memory) and a RAM (Random Access Memory) storing a calculation program, etc. executed by the CPU, and an interface unit (I/F) that inputs and outputs signals to and from the outside. The CPU, the memory, and the interface unit are connected to one another through a data bus or the like.

The actuator 2 is an example of driving means. The actuator 2 is, for example, a servomotor. The actuator 2 is provided at each of the joints such as a wrist joint, an elbow joint, and a shoulder joint of the robot, and rotationally drives each joint. The rotation unit 21 is connected to a rotating shaft 22 of the actuator 2, and the rotation unit 21 rotates with the rotating shaft 22 (FIG. 2).

The braking unit 3 is an example of braking means. The braking unit 3 causes the armature 31 (pressing unit) to be brought into contact with the rotation unit 21 of the actuator 2 and presses the armature 31 against the rotation unit 21 of the actuator 2 to generate a frictional force between the rotation unit 21 and the armature 31, so that the actuator 2 is braked by the frictional force. On the other hand, the braking unit 3 releases the braking of the actuator 2 by separating the armature 31 from the rotation unit 21 of the actuator 2.

Figure 2:
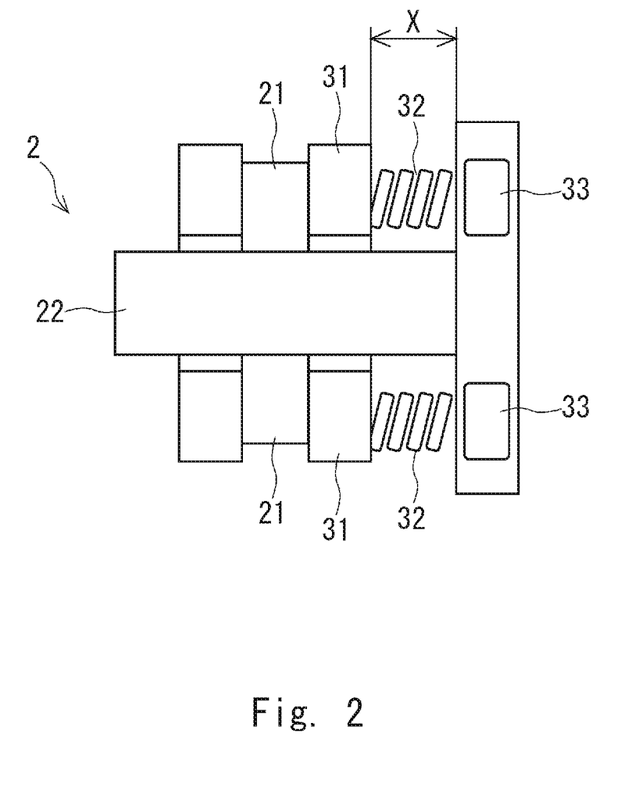
FIG. 2 is a view showing a schematic configuration of a braking unit.

FIG. 2 is a view showing a schematic configuration of the braking unit. The braking unit 3 includes an armature 31 to be brought into contact with the rotation unit 21 of the actuator 2, spring members 32 for biasing the armature 31, and electromagnetic coils 33 for attracting the armature 31.

The spring members 32 of the braking unit 3 press the armature 31 against the rotation unit 21 by biasing the armature 31 toward the rotation unit 21 side. On the other hand, the electromagnetic coils 33 separate the armature 31 from the rotation unit 21 by attracting the armature 31 to the electromagnetic coil 33 side against the bias of the spring members 32.

In response to a braking release signal from the control unit 5, the braking unit 3 releases the braking of the actuator 2 by exciting the electromagnetic coils 33 to attract the armature 31, separating the armature 31 from the rotation unit 21, and returning it to a predetermined position. For example, a stopper or the like is provided at a predetermined distance from the electromagnetic coils 33. The predetermined position is mechanically determined by the stopper.

The braking unit 3 stops the attraction of the electromagnetic coil 33 in response to a braking signal from the control unit 5. Then, the armature 31 is pressed against the rotation unit 21 by a biasing force of the spring members 32 and brakes the rotation unit 21 of the actuator 2.

The encoder 4 detects a rotation angle of the rotating shaft 22 of the actuator 2 and outputs the detected rotation angle to the control unit 5. The actuator 2, the encoder 4, and the braking unit 3 may be integrally configured.

The control unit 5 is an example of control means. The control unit 5 includes an actuator control unit 51 that controls the actuator 2, and a braking control unit 52 that controls the braking unit 3. The actuator control unit 51 performs, for example, feedback control of the actuator 2.

The actuator control unit 51 generates a command current value for controlling the actuator 2 based on a command value for controlling a robot arm and the rotation angle from the encoder 4. The actuator control unit 51 outputs the generated command current value to the actuator 2. The actuator 2 is rotationally driven in accordance with the command current value from the actuator control unit 51.

The braking control unit 52 outputs, to the braking unit 3, a braking signal serving as a trigger for braking. The braking unit 3 brakes the actuator 2 in response to the braking signal from the braking control unit 52. On the other hand, the braking control unit 52 outputs, to the braking unit 3, the braking release signal serving as a trigger for releasing the braking. The braking unit 3 releases the braking of the actuator 2 in response to the braking release signal from the braking control unit 52.

When the actuator 2 does not operate, the braking unit 3 brakes the actuator 2 to maintain the posture of the robot arm. This can effectively prevent, for example, the robot arm from falling due to its own weight. The posture of the robot arm is changed from the state in which the actuator 2 is braked.

To change the posture of the robot arm, the control unit 5 first outputs the braking release signal to the braking unit 3 to cause the electromagnetic coils 33 of the braking unit 3 to separate the armature 31 from the rotation unit 21, and to return the armature 31 to the predetermined position, so that the braking of the actuator 2 is released.

A period in which the braking release signal is output from the control unit 5 to the braking unit 3, and the armature 31 is separated from the rotation unit 21 and is returned to the predetermined position is referred to as a braking release period. In the braking release period, the control unit 5 controls the actuator 2 based on the rotation angle from the encoder 4 to control the gravity compensation for temporarily maintaining the rotation position of the joint of the robot arm at that position.

After that, the control unit 5 controls the actuator 2 to drive the joint of the robot arm to thereby change the posture of the robot arm.

Figure 3:
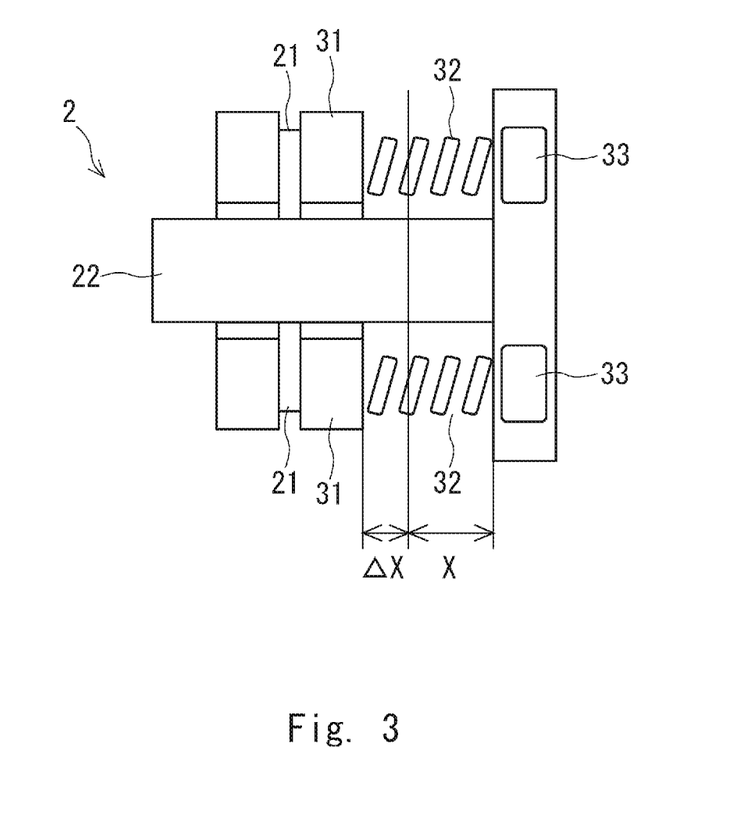
FIG. 3 is a view showing a state in which a rotation unit becomes worn down.

Incidentally, when the rotation unit 21 becomes worn down due to friction between the armature 31 and the rotation unit 21 at the time of the armature 31 braking the rotation unit 21, as shown in FIG. 3, the armature 31 needs to move to the rotation unit 21 side greater than before. Then, the biasing force of the spring member 32 for pressing the armature 31 against the rotation unit 21 becomes insufficient, and the braking torque of the armature 31 for the rotation unit 21 becomes insufficient. As a result, so-called braking slip occurs, and the posture of the robot arm may be collapsed.

On the other hand, as described above, in the control apparatus 1 according to the first embodiment includes the abnormality determination unit 6. The abnormality determination unit 6 determines that the braking unit 3 is abnormal when a command time for the actuator 2 at the time of temporarily maintaining the rotation position of the joint of the robot arm is longer than or equal to a predetermined time. The abnormality determination unit 6 predicts an abnormality of the braking unit 3 that the braking torque of the actuator 2 is insufficient, to notify the user thereof, brake the actuator 2, stop the actuator 2, and so on. As the result the posture of the robot can be effectively prevented from being collapsed.

As described above, when the rotation unit 21 wears, the armature 31 moves to the rotation unit 21 side greater than before when the armature 31 brakes the rotation unit 21. Thus, in this state, the attraction time until the armature 31 is separated from the rotation unit 21 and is returned to the predetermined position by the attraction of the electromagnetic coil 33 is longer than that when the rotation unit 21 is not worn down (FIG. 3). The attraction time (braking release period) is equal to the command time for the actuator 2 at the time of temporarily maintaining the rotation position of the joint of the robot arm.

Therefore, when the command time for the actuator 2 at the time of temporarily maintaining the rotation position of the joint of the robot arm, i.e., the attraction time, is long, meaning that it is longer than or equal to a predetermined time, the abnormality determination unit 6 can determine that the braking unit 3 is abnormal because of the worn rotation unit 21.

The abnormality determination unit 6 is an example of abnormality determination means. The abnormality determination unit 6 calculates the attraction time $T_B$ of the electromagnetic coil 33 based on the command current value output from the actuator control unit 51 to the actuator 2. The abnormality determination unit 6 may calculate the attraction time $T_B$ of the electromagnetic coil 33 based on a feedback current value of the command current value output from the actuator control unit 51 to the actuator 2. The attraction time $T_B$ is, for example, a time from the state in which the armature 31 is brought into contact with the rotation unit 21 and pressed against the rotation unit 21 until when the armature 31 is separated from the rotation unit 21 by the electromagnetic coils 33 and is returned to the predetermined position.

For example, the abnormality determination unit 6 calculates the time from when the braking control unit 52 outputs the braking release signal to the braking unit 3 until the command current value for performing the gravity compensation is output to the actuator 2 as the command time for the actuator 2 at the time of temporarily maintaining the rotation position of the joint of the robot arm. Then, the abnormality determination unit 6 defines the calculated command time as the attraction time $T_B$ of the electromagnetic coils 33. Note that the method of calculating the attraction time $T_B$ is an example, and is not limited to this.

The abnormality determination unit 6 calculates the braking torque when the armature 31 is pressed against the rotation unit 21 based on the calculated attraction time $T_B$, and when the calculated braking torque is less than or equal to a threshold, the abnormality determination unit 6 determines that the braking unit is abnormal.

For example, the abnormality determination unit 6 calculates a movement distance $(X+\Delta X)$ of the armature 31 based on the calculated attraction time $T_B$. X is a distance from the position where the armature 31 is contact with the rotation unit 21 which is not worn down to a predetermined position. $\Delta X$ is a distance the armature 31 is moved closer to the rotation unit 21 than the distance X due to the wearing down of the rotation unit 21. The abnormality determination unit 6 calculates the movement distance $(X+\Delta X)$ of the armature 31 by, for example, integrating acceleration (average acceleration, etc.) of the armature 31 with the attraction time $T_B$.

The abnormality determination unit 6 calculates a pressing force $F_S$ of the spring member 32 using the following formula based on the calculated movement distance $(X+\Delta X)$. In the following formula, K is an elastic coefficient of the spring member 32.

$$\text{Pressing force } F_S = K(X+\Delta X)$$

The abnormality determination unit 6 calculates the braking torque $t_B$ of the armature 31 for the rotation unit 21 using the following formula based on the calculated pressing force $F_S$. In the following formula, μ is a friction coefficient.

$$\text{Braking torque } t_B = \mu F_S$$

When the abnormality determination unit 6 determines that the calculated braking torque $t_B$ is less than or equal to the threshold, it determines that the braking torque of the armature 31 for the rotation unit 21 is insufficient, and the braking unit 3 is abnormal. Note that a value when the braking torque of the armature 31 is insufficient for the rotation unit 21 is experimentally obtained as the threshold, and the obtained value is stored in advance in a memory, etc.

Alternatively, when the abnormality determination unit 6 determines that the calculated attraction time $T_B$ is longer than or equal to the predetermined time, it may determine that the braking torque of the armature 31 for the rotation unit 21 is insufficient, and the braking unit 3 is abnormal. The attraction time when the braking torque of the armature 31 is insufficient is experimentally obtained as the predetermined time, and the predetermined time is set in the memory.

When the abnormality determination unit 6 determines that the braking unit 3 is abnormal, it outputs an abnormality signal including an error code and the like to the notification unit 7. In response to the abnormality signal from the abnormality determination unit 6, the notification unit 7 notifies the user of the abnormality in the braking unit 3 that the braking torque of the actuator 2 is insufficient.

The notification unit 7 is composed of, for example, a speaker for notifying the user of the abnormality of the braking unit 3 by a warning sound, a light for notifying the user with warning light, and so on. The notification unit 7 may be composed of any combination of a display that notifies the user of a replacement of a part of the braking unit 3 such as the rotation unit 21 and the armature 31 and the above components. In response to the notification from the notification unit 7, the user can effectively prevent the posture of the robot from being collapsed by, for example, replacing the worn rotation unit 21.

When the actuator control unit 51 receives the abnormality signal from the abnormality determination unit 6, the actuator control unit 51 may perform control to brake the actuator 2. The actuator control unit 51 may stop driving the actuator 2 in response to the reception of the abnormality signal from the abnormality determination unit 6. Furthermore, in response to the reception of the abnormality signal from the abnormality determination unit 6, the actuator control unit 51 may perform at least one of the above notification to the user, braking of the actuator 2, and stopping of the actuator 2.

Figure 4:
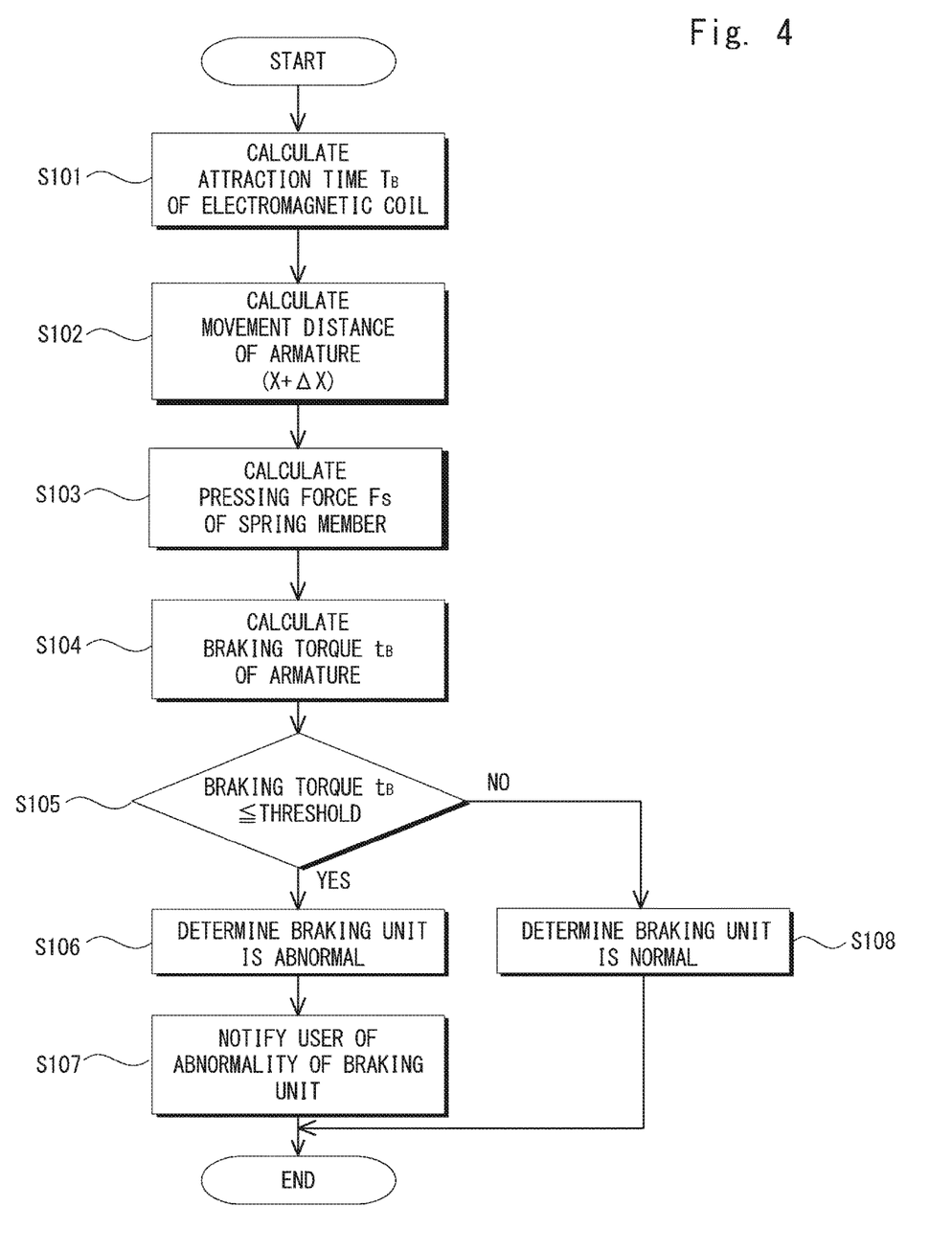
FIG. 4 is a flowchart showing a flow of a processing method of a robot control apparatus according to the first embodiment of the present disclosure.

FIG. 4 is a flowchart showing a flow of a method for controlling a robot control apparatus according to this embodiment.

The abnormality determination unit 6 calculates the attraction time $T_B$ of the electromagnetic coils 33 based on the command current value output from the actuator control unit 51 to the actuator 2 (Step S101).

The abnormality determination unit 6 calculates the movement distance $(X+\Delta X)$ of the armature 31 based on the calculated attraction time $T_B$ (Step S102). The abnormality determination unit 6 calculates the pressing force $F_S$ of the spring member 32 based on the calculated movement distance $(X+\Delta X)$ (Step S103).

The abnormality determination unit 6 calculates the braking torque $t_B$ of the armature 31 for the rotation unit 21 based on the calculated pressing force $F_S$ (Step S104). The abnormality determination unit 6 determines whether the calculated braking torque $t_B$ is equal to or less than the threshold (Step S105).

When the abnormality determination unit 6 determines that the calculated braking torque $t_B$ is less than or equal to the threshold (YES in Step S105), it determines that the braking torque of the armature 31 for the rotation unit 21 is insufficient, and the braking unit 3 is abnormal (Step S106). In response to the abnormality signal from the abnormality determination unit 6, the notification unit 7 notifies the user of the abnormality of the braking unit 3 that the braking torque of the actuator 2 is insufficient (Step S107).

On the other hand, when the abnormality determination unit 6 determines that the calculated braking torque $t_B$ is not less than or equal to the threshold (NO in Step S105), it determines that the braking unit 3 is normal (Step S108), and ends this processing.

As described above, the control apparatus 1 according to the first embodiment includes the abnormality determination unit 6. The abnormality determination unit 6 determines that, when the command time for the actuator 2 at the time of temporarily maintaining the rotation position of the joint of the robot arm becomes longer than or equal to the predetermined time, the braking unit 3 is abnormal. The abnormality determination unit 6 predicts an abnormality of the braking unit 3 that the braking torque of the actuator 2 is insufficient to notify the user thereof, brake the actuator 2, stop the actuator 2, and so on, so. As the result the posture of the robot can be effectively prevented from being collapsed.

Second Embodiment

Figure 5:
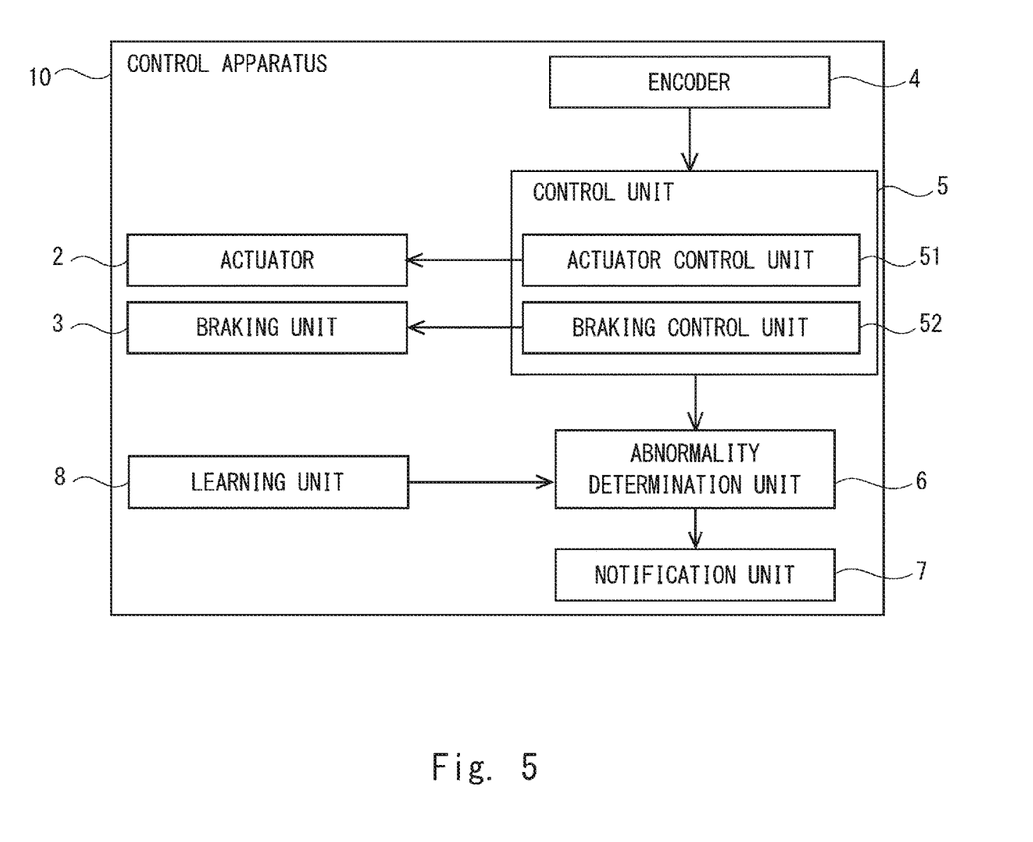
FIG. 5 is a block diagram showing a schematic system configuration of a control apparatus according to a second embodiment of the present disclosure.

FIG. 5 is a block diagram showing a schematic system configuration of a control apparatus according to a second embodiment of the present disclosure. The control apparatus 10 according to the second embodiment further includes a learning unit 8. The learning unit 8 inputs the attraction time of the electromagnetic coils 33, and outputs the abnormality of the braking unit 3 to machine-learn the relationship between the attraction time of the electromagnetic coils 33 and the abnormality determination of the braking unit 3.

The learning unit 8 is an example of learning means. The learning unit 8 performs deep learning in advance using learning data in which the attraction time of the electromagnetic coil 33 when the rotation unit 21 wears, which is the input, is associated with the abnormality determination of the braking unit 3, which is the output.

The learning unit 8 is composed of, for example, a neural network such as a CNN (Convolutional Neural Network) or an RNN (Recurrent Neural Network). The RNN may include a LSTM (Long Short Term Memory) in the intermediate layer.

The abnormality of the braking unit 3 can be more accurately determined by the learning unit 8 learning the attraction time of the electromagnetic coils 33 and capturing the characteristics thereof. The learning unit 8 may be composed of another learning device such as a support vector machine (SVM) instead of the neural network.

Figure 6:
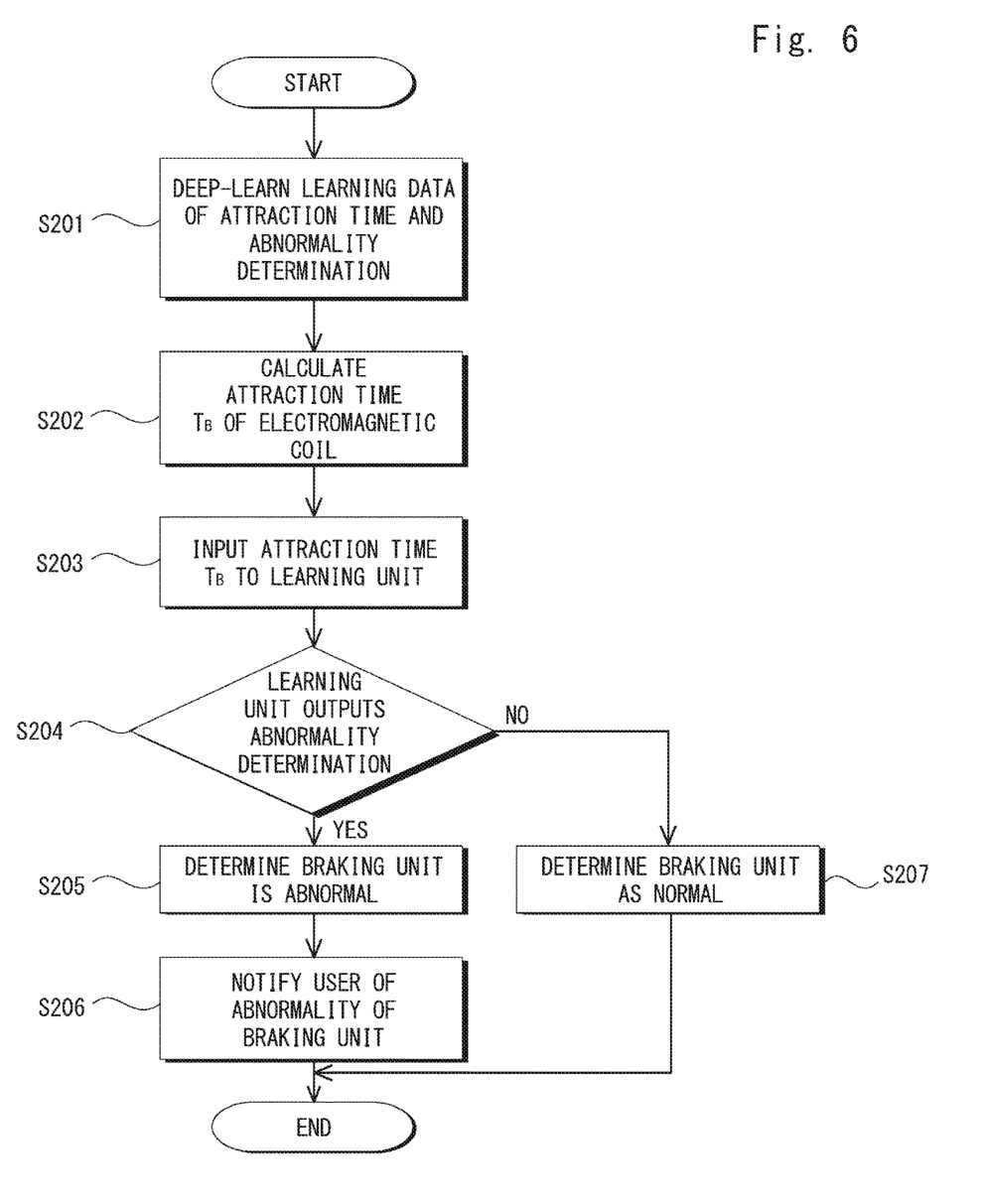
FIG. 6 is a flowchart showing a flow of a processing method of the control apparatus according to the second embodiment of the present disclosure.

FIG. 6 is a flowchart showing a flow of the processing method of the control apparatus according to the second embodiment of the present disclosure. The learning unit 8 performs deep learning using the learning data in which the attraction time of the electromagnetic coil 33 is associated with the abnormality determination of the braking unit 3 (Step S201).

The abnormality determination unit 6 calculates the attraction time $T_B$ of the electromagnetic coil 33 based on the command current value output from the actuator control unit 51 to the actuator 2 (Step S202).

The abnormality determination unit 6 calculates the attraction time $T_B$ of the electromagnetic coil 33 based on the command current value output from the actuator control unit 51 to the actuator 2. The calculated attraction time $T_B$ of the electromagnetic coils 33 is input to the learning unit 8 (Step S203).

When the learning unit 8 outputs the abnormality determination of the braking unit 3 (YES in Step S204), the abnormality determination unit 6 determines that the braking torque of the armature 31 for the rotation unit 21 is insufficient, and the braking unit 3 is abnormal (Step S205).

In response to the abnormality signal from the abnormality determination unit 6, the notification unit 7 notifies the user of the abnormality of the braking unit 3 that the braking torque of the actuator 2 is insufficient (Step S206). On the other hand, when the learning unit 8 does not output the abnormality determination of the braking unit 3 (NO in Step S204), the abnormality determination unit 6 determines that the braking unit 3 is normal (Step S207), and ends this processing.

Note that the learning unit 8 may learn using the learning data in which the attraction time of the electromagnetic coil 33 when the rotation unit 21 is not worn is associated with a normality determination of the braking unit 3. In this case, when the learning unit 8 outputs the normality determination of the braking unit 3, the abnormality determination unit 6 determines that the braking unit 3 is normal. On the other hand, when the learning unit 8 does not output the normality determination of the braking unit 3, the abnormality determination unit 6 determines that the braking unit 3 is abnormal.

In the second embodiment, the same components as those of the first embodiment are denoted by the same reference signs, and the detailed descriptions thereof are omitted.

Although some embodiments of the present disclosure have been described, these embodiments have been presented merely as examples and are not intended to limit the scope of the present disclosure. These novel embodiments can be implemented in various forms other than those described above. Various omissions, substitutions, and changes can be made without departing from the spirit of the present disclosure. These embodiments and modifications of the embodiments are included in the scope and the spirit of the present disclosure and included in the present disclosure described in claims and a scope of equivalents of the present disclosure.

In the above-mentioned embodiments, although the control apparatuses 1 and 10 control a robot, the present disclosure is not limited to this. The control apparatuses 1 and 10 may perform control of any mechanism that is applied with a constant load and is braked by the braking unit 3.

In the above embodiments, although the control unit 5 performs the control of the gravity compensation, the control unit 5 may be configured to perform control to generate holding torque that temporarily maintains the rotation position of a predetermined mechanism.

The present disclosure can be also achieved by, for example, causing a CPU to execute a computer program for the processing shown in FIG. 4 and FIG. 6.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control apparatus comprising:
   driving means for rotationally driving a predetermined mechanism;
   braking means for braking the driving means by bringing a pressing unit into contact with a rotation unit of the driving means and pressing the pressing unit against the rotation unit of the driving means; and
   control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position, wherein
   when a command time for the driving means at the time of temporarily maintaining the rotation position of the predetermined mechanism is longer than or equal to a predetermined time, the control apparatus performs at least one of notification to a user, the braking of the predetermined mechanism, and stopping of the driving means.

2. The control apparatus according to claim 1, further comprising:
   abnormality determination means for calculating the command time as an attraction time from a state in which the pressing unit is brought into contact with the rotation unit and is pressed against the rotation unit until the pressing unit is separated from the rotation unit and is returned to the predetermined position, calculating braking torque when the pressing unit is pressed against the rotation unit based on the calculated attraction time, and determining that the braking means is abnormal when the calculated braking torque becomes less than or equal to a threshold, wherein
   the control means performs at least one of the notification to the user, the braking of the predetermined mechanism, and the stopping of the driving means when the abnormality determination means determines that the braking means is abnormal.

3. The control apparatus according to claim 1, further comprising:
   learning means for inputting an attraction time, and outputting an abnormality determination of the braking means to machine-learn a relationship between the attraction time and the abnormality determination of the braking means, the attraction time being a time from a state in which the pressing unit is brought into contact with the rotation unit until the pressing unit is separated from the rotation unit and is returned to a predetermined position; and
   abnormality determination means for determining that the braking means is abnormal when the attraction time is input to the machine learning means, and the learning means outputs an abnormal determination of the braking means, wherein when the abnormality determination means determines that the control means is abnormal, the control means performs at least one of the notification to the user, the braking of the predetermined mechanism, and the stopping of the driving means.

4. A processing method of a control apparatus comprising:
driving means for rotationally driving a predetermined mechanism;
braking means for braking the driving means by bringing a pressing unit into contact with a rotation unit of the driving means and pressing the pressing unit against the rotation unit of the driving means; and
control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position, the processing method comprising
performing at least one of notification to a user, the braking of the predetermined mechanism, and stopping of the driving means when a command time for the driving means at the time of temporarily maintaining the rotation position of the predetermined mechanism is longer than or equal to a predetermined time.

5. A non-transitory computer readable medium storing a program of a control apparatus comprising:
driving means for rotationally driving a predetermined mechanism;
braking means for braking the driving means by bringing a pressing unit into contact with a rotation unit of the driving means and pressing the pressing unit against the rotation unit of the driving means; and
control means for, in order to change a rotation position of the predetermined mechanism, controlling the driving means in a braking release period to temporarily maintain the rotation position of the predetermined mechanism, and then driving the predetermined mechanism to thereby change the rotation position, the braking release period being a period in which the braking means is controlled so that the pressing unit is separated from the rotation unit, and the pressing unit is returned to a predetermined position, wherein the program causes a computer to execute:
a process of performing at least one of notification to a user, the braking of the predetermined mechanism, and stopping of the driving means when a command time for the driving means at the time of temporarily maintaining the rotation position of the predetermined mechanism is longer than or equal to a predetermined time.

* * * * *